United States Patent [19]

Yoshida et al.

[11] Patent Number: 5,068,676
[45] Date of Patent: Nov. 26, 1991

[54] IMAGE DATA STORING DEVICE FOR AN IMAGE FORMING APPARATUS

[75] Inventors: Yoshiki Yoshida, Yokohama; Kenichirou Asada, Tokyo, Japan

[73] Assignee: Ricoh Company, Ltd., Tokyo, Japan

[21] Appl. No.: 565,337

[22] Filed: Aug. 10, 1990

[30] Foreign Application Priority Data

Aug. 21, 1989 [JP] Japan .................................. 1-213081

[51] Int. Cl.[5] .......................... G01D 9/42; H04H 1/21
[52] U.S. Cl. ..................................... 346/108; 358/296
[58] Field of Search ................... 346/108, 102 R, 160; 358/296

[56] References Cited

U.S. PATENT DOCUMENTS 4,477,820 10/1984 Moriguchi et al. ............ 346/76 PH
5,018,130 5/1991 Suzuki et al. ............................ 370/1

Primary Examiner—Mark J. Reinhart
Attorney, Agent, or Firm—Oblon, Spivak, McClelland, Maier & Neustadt

[57] ABSTRACT

An image data storing device for an image forming apparatus having a plurality of line buffers to which image data are written from external equipment and from which the written image data are read to form an image. Selectors selectively cause the individual buffers into a read state, write state, and inoperative state. An image forming signal generator generates an image forming signal during one frame of image forming period. During an image forming period, the selectors condition each of the line buffers for any one of the above-mentioned three different states while, during a non-image forming period, they hold the line buffers in the individual states. This allows the line buffers to start operating under the same conditions whenever an image forming period is reached.

1 Claim, 11 Drawing Sheets

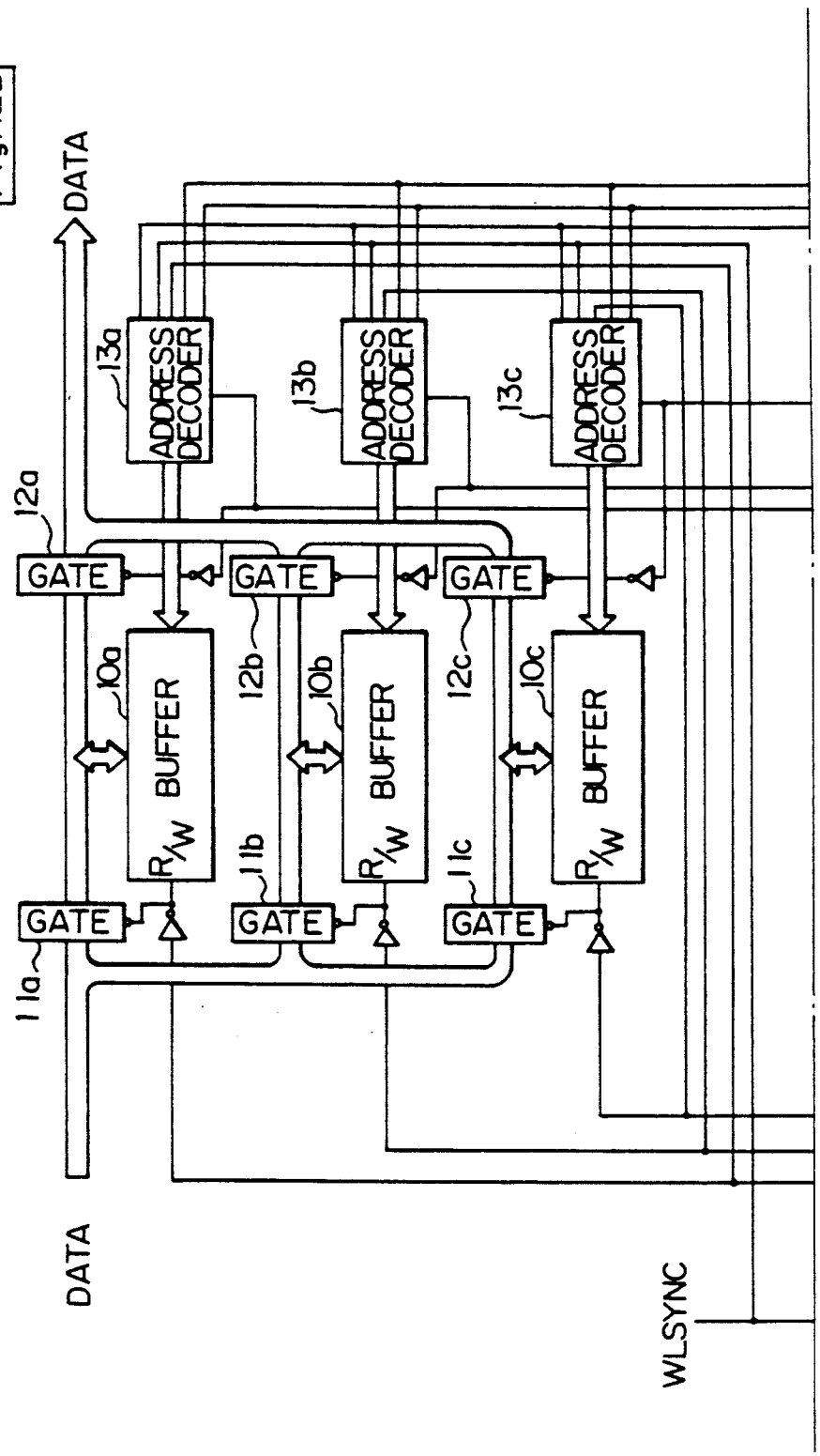

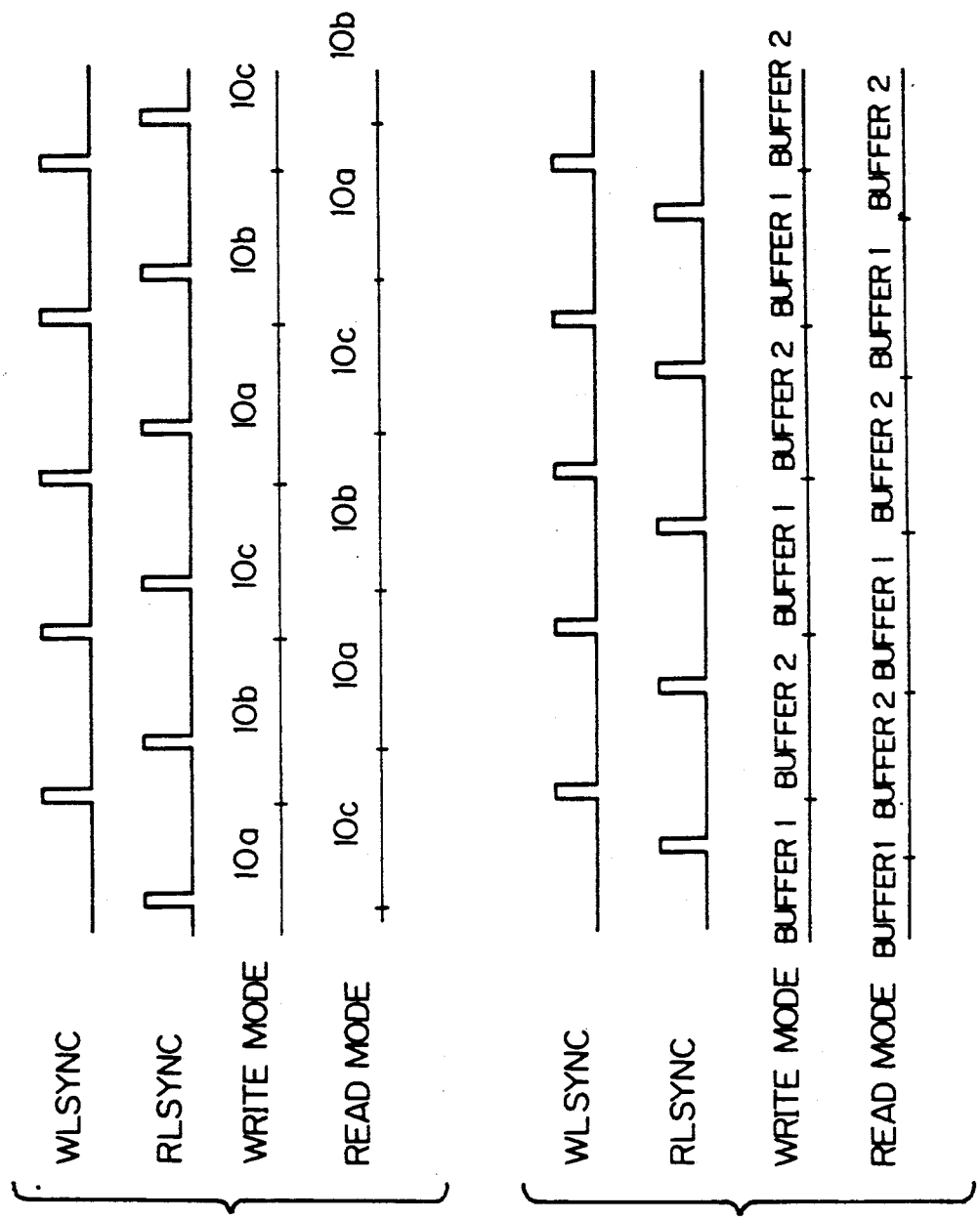

IMAGE DATA STORING DEVICE FOR AN IMAGE FORMING APPARATUS

BACKGROUND OF THE INVENTION

The present invention relates to an image data storing device for an image forming apparatus and, more particularly, to an image data storing device to which image data are written by external equipment and from which the written data are read for forming an image.

A laser beam printer, or simply laser printer, is one of image forming apparatuses using the above-described type of image data storing device. Usually, in a laser printer, a laser beam issuing from from a semiconductor laser is collimated by a collimator lens to reach a scanning unit in the form of a rotary polygonal mirror. The polygonal mirror steers the incident laser beam toward an F-theta lens which in turn focuses it onto a charged surface of a photoconductive element. As the polygonal mirror is rotated, the beam spot formed on the photoconductive element is moved in the main scanning direction. At the same time, the photoconductive element is rotated to be thereby scanned in the subscanning direction by the beam spot. A photodector is located in a position outside of image data writing range of the photoconductive element. By detecting the laser beam deflected by the mirror, the photodector develops a synchronizing (sync) signal and delivers it to a signal processing circuit. In response to the sync signal, the signal processing circuit feeds incoming image data to a laser driver at predetermined timings. The laser driver drives the laser in response to the image data. As a result, a laser beam having been modulated by the image data scans the photoconductive element to electrostatically form a latent image thereon. The latent image is developed by a developing unit and then transferred to a paper sheet or similar recording medium. A horizontal sync signal derived from the sync signal outputted by the photodector is applied to external equipment.

The laser printer 1 constructed and operated as stated above does not supply the external equipment with information relating to the scanning speed thereof, i.e. the rotation speed and the number of surfaces of the polygonal mirror. Therefore, it is likely that the next one line of image data is sent from the external equipment to the printer before the latter fully writes the preceding line of image data, resulting in the conflict of image data. Should the write and read operations conflict with each other as mentioned, i.e., should one of them catch up with the other, signals would conflict on the I/O terminals of the line buffers to destroy a RAM included in the image data storing device and/or to cause the data to be lost.

SUMMARY OF THE INVENTION

It is therefore an object of the present invention to provide an image data storing device for an image forming apparatus which prevents a write and a read operation from conflicting with each other and thereby eliminates the damage to a RAM or similar storage as well as the loss of data.

It is another object of the present invention to provide a generally improved image data storing device for an image forming apparatus.

An image data storing device for an image forming apparatus of the present invention comprises a plurality of line buffers for storing one line of data each, a writing section for writing image data transferred from external equipment to the plurality of line buffers in response to an external line synchronizing signal fed from the external equipment, an internal line sync signal generating section for generating an internal line sync signal which is not synchronous to the external line sync signal, an image forming signal generating section for generating an image forming signal in association with an image forming period for forming one frame of image, a selecting section for causing each of the plurality of line buffers into particular one of a read state, a write state, and an inoperative state, and a control for causing, during a non-image forming period, the selecting section to selectively cause the plurality of line buffers into the read state, write state and inoperative state in response to the image forming signal while, during a non-image forming period, causing the selecting section to maintain the plurality of buffers in the read state, write state, and inoperative state.

BRIEF DESCRIPTION OF THE DRAWINGS

The above and other objects, features and advantages of the present invention will become more apparent from the following detailed description taken with the accompanying drawings in which:

FIG. 13 shows the waveforms of signals appearing in the alternative embodiment; and FIG. 14 the waveforms of signals which would appear if the alternative embodiment were not adopted.

DESCRIPTION OF THE PREFERRED EMBODIMENTS

Figure 1:
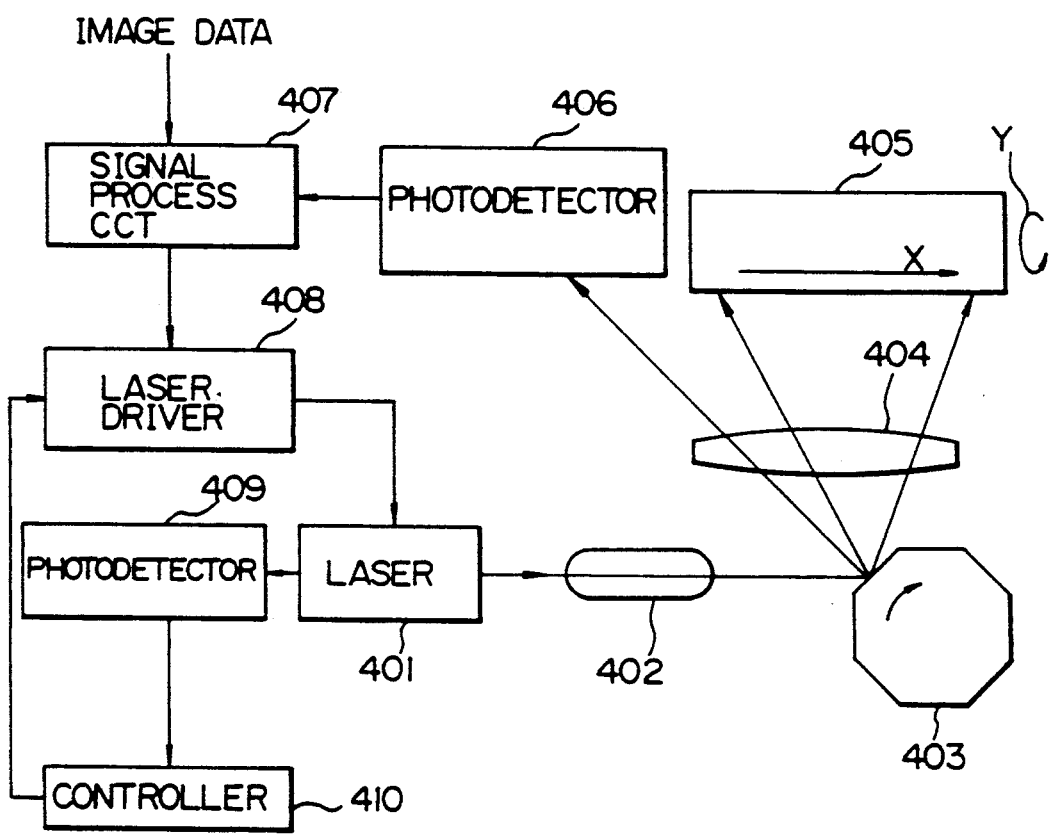
FIG. 1 is a block diagram schematically showing a conventional laser printer.

To better understand the present invention, a brief reference will be made to a laser laser printer belonging to a family of image forming apparatuses to which the present invention is applicable, shown in FIG. 1. As shown, a laser beam issuing from from a semiconductor laser 401 is collimated by a collimator lens 402 to reach a scanning unit in the form of a rotary polygonal mirror 403. The polygonal mirror 403 steers the incident laser beam toward an F-theta lens 404 which in turn focuses it onto a charged surface of a photoconductive element 405. As the polygonal mirror 403 is rotated, the beam spot formed on the photoconductive element 405 is moved in the main scanning direction, as indicated by an arrow X in the figure. At the same time, the photoconductive element 40 is rotated in a direction indicated by an arrow Y, whereby the beam spot scans the element 40 in the subscanning direction. A photodetector 406 is located in a position outside of image data writing range of the photoconductive element 40. By detecting the laser beam deflected by the mirror 403, the photodetector 406 develops a synchronizing (sync) signal and delivers it to a signal processing circuit 407. In response to the sync signal, the signal processing circuit 407 feeds incoming image data to a laser driver 408 at predetermined timings. The laser driver 408 drives the laser 401 in response to the image data. As a result, a laser beam having been modulated by the image data scans the photoconductive element 405 to electrostatically form a latent image thereon. The latent image is developed by a developing unit and then transferred to a paper sheet or similar recording medium. On the other hand, a laser beam issuing backward from the laser 401 is incident to another photodetector 409. A control circuit 410 controls the laser driver 408 in response to an output of the photodetector 409 which is representative of the intensity of the incident laser beam, thereby maintaining the quantity of output light of the laser 401 constant.

Figure 2:
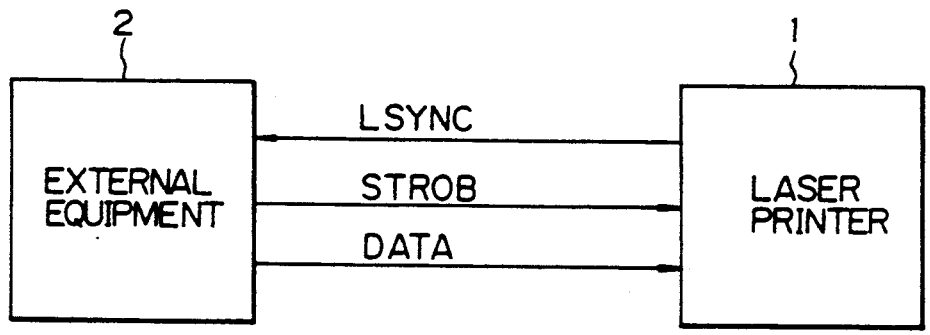
FIG. 2 is a block diagram schematically showing signals which are interchanged between the laser printer and external equipment.
Figure 3:
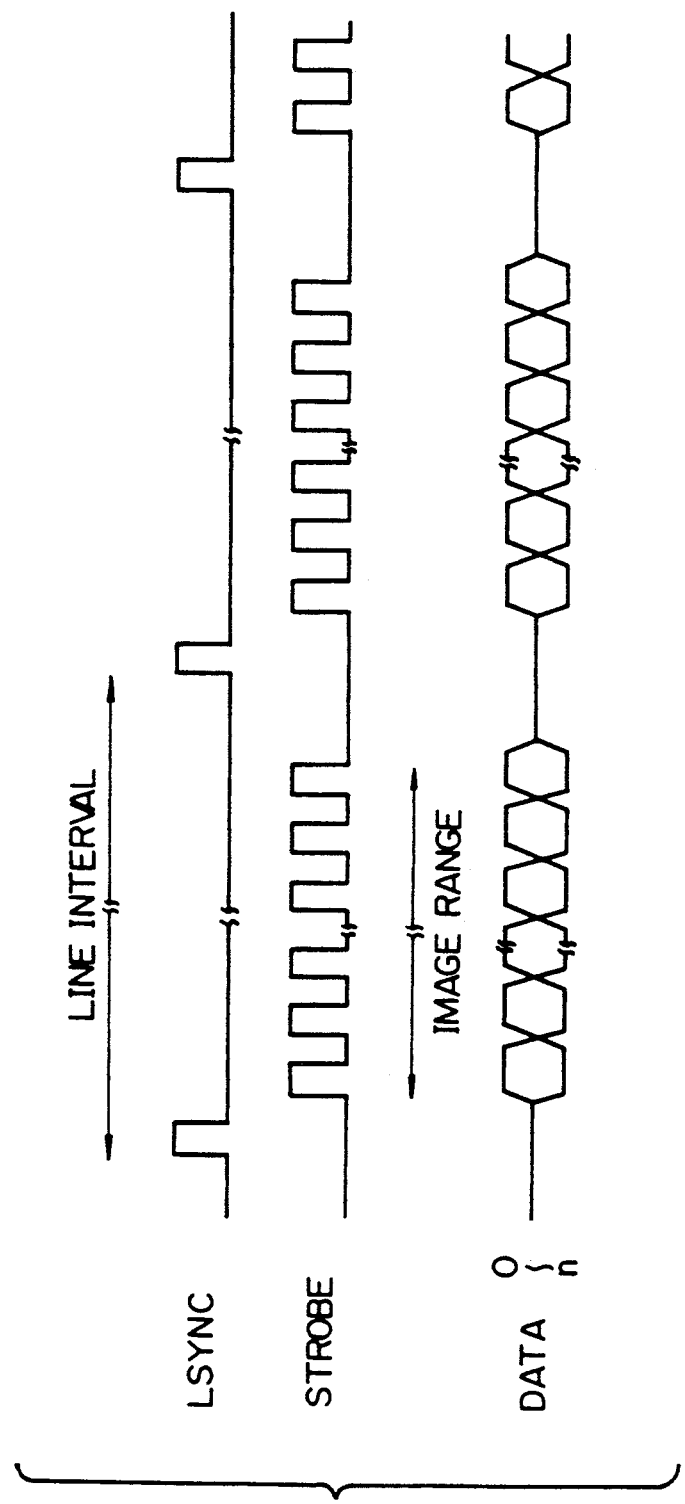
FIG. 3 shows the waveforms of signals indicated in FIG. 2.

FIG. 2 shows signals which are interchanged between the laser printer 1 and external equipment 2. The signals include a horizontal sync signal LSNC which is outputted by the laser printer 1 in association with the sync signal from the photodetector 406, FIG. 1. When the laser beam is steered by the polygonal mirror 403 as shown in FIG. 1, the writing speed of the laser printer 1 is determined by the rotation speed and the number of surfaces of the mirror 403. The horizontal synchronization of the laser printer 1 is implemented with the signal LSYNC. FIG. 3 depicts the waveforms of the signals shown in FIG. 2. As shown, the external equipment 2 feeds to the laser printer 1 image data DATA and a strobe signal STROBE indicative of the beginnings and ends and the ranges of image data DATA. The laser printer 1 delivers the horizontal sync signal LSYNC to the external equipment 2, as mentioned earlier.

Generally, the laser printer 1 does not supply the external equipment 2 with information relating to the scanning speed thereof, i.e. the rotation speed and the number of surfaces of the polygonal mirror 403. Assume that the image data storage constituted by a plurality of line buffers, and that the equipment 2 transfers image data to the laser printer 1 line by line at intervals which are shorter than the intervals of the horizontal sync signal LSYNC, for example. Then, it is likely that the next one line of image data DATA is sent from the equipment 2 to the printer 1 before the latter fully writes the preceding one line of image data, resulting in the conflict of image data DATA. Should the write and read operations conflict with each other as mentioned, i.e., should one of them catch up with the other, signals would conflict on the I/O terminals of the line buffers to destroy a RAM included in the image data storage and/or to cause the data to be lost.

Preferred embodiments of the image data storing device in accordance with the present invention will be described with reference to FIGS. 4 through 14. In the figures, the same or similar components as those of the prior art are designated by the same reference numerals, and redundant description will be avoided for simplicity.

Figure 4:
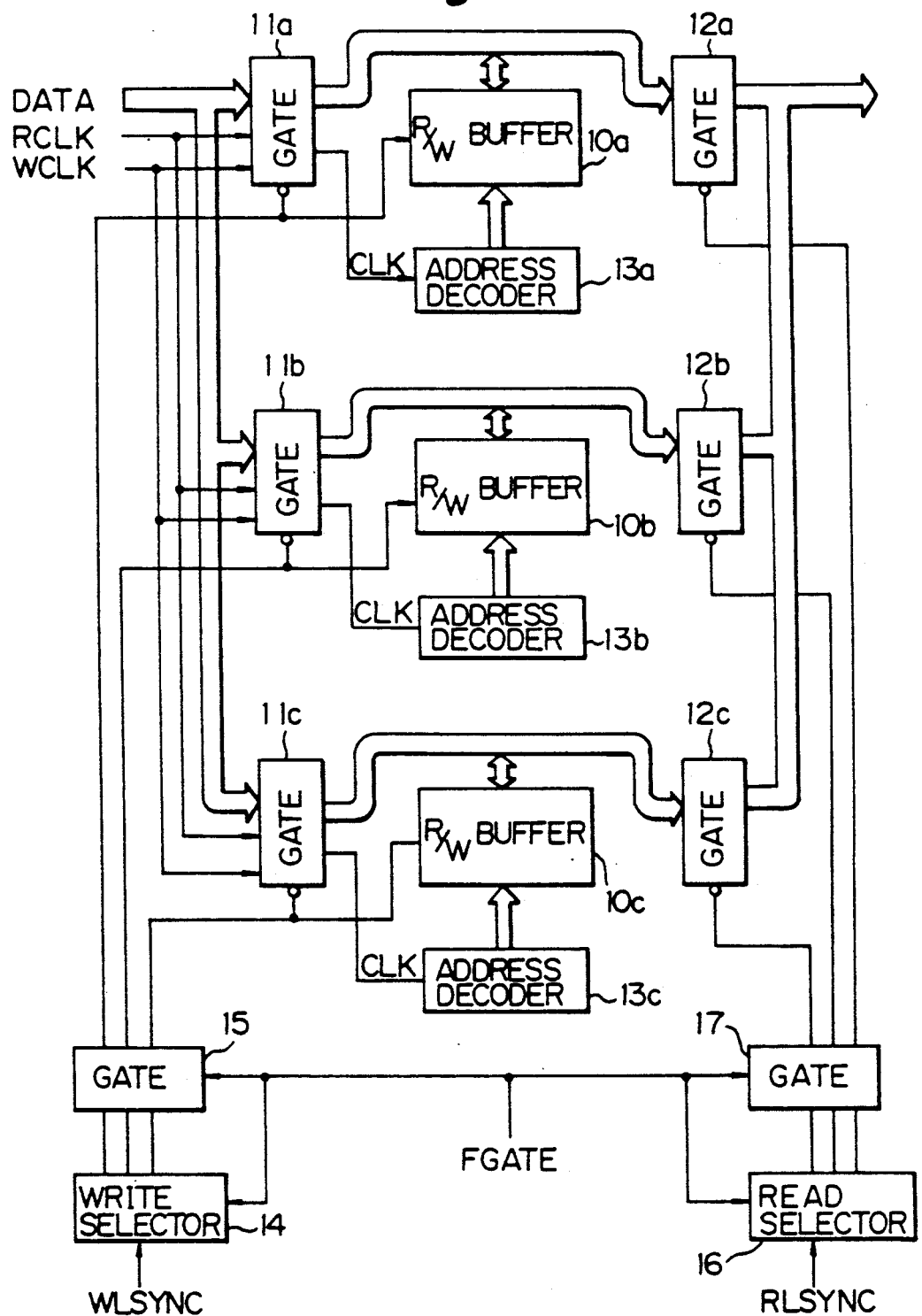
FIG. 4 is a block diagram schematically showing a preferred embodiment of the image data storing device in accordance with the present invention.

Referring to FIG. 4, an image data storing device embodying the present invention includes buffers 10a, 10b and 10c each for accommodating one line of image data. Gates 11a, 11b and 11c each is associated with respective one of the buffers 10a, 10b and 10c. Image data DATA is written to any of the buffers 10a, 10b and 10c via the associated gates 11a, 11b and 11c. A write selector 14 is connected to a gate 15 which is in turn connected to the gates 11a to 11c and buffers 10a to 10c. Address decoders 10a, 13b and 13c are connected respectively to the buffers 10a. 10b and 10c so as to feed address signals to the latter. A read pixel clock RCLK and a write pixel clock WCLK are applied to the gates 11a to 11c which in turn apply a clock CLK to their associated address decoders 13a to 13c.

Gates 12a, 12b and 12c are also associated with the buffers 10a, 10b and 10c, respectively. Image data DATA written to the buffers 10a to 10c are selectively read thereoutof via the associated gates 12a to 12c under the control of a read selector 16. The read selector 16 is connected to a gate 17 which is in turn connected to the gates 12a to 12c. A write line sync signal WLSYNC and a read line sync signal RSYNC are fed to the write selector 14 and the read selector 16, respectively. An image forming signal FGATE is delivered to the gates 15 and 17 and selectors 14 and 16.

Figure 5:
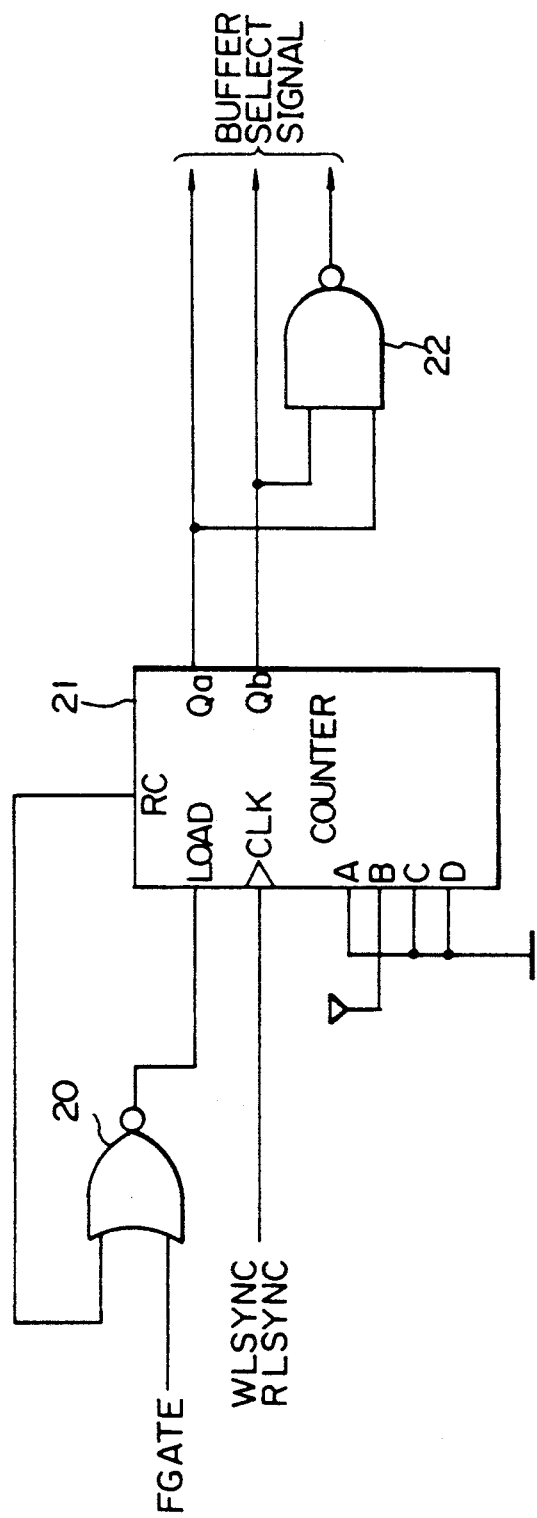
FIG. 5 is a block diagram schematically showing a specific construction of a write selector or a read selector included in the embodiment.

FIG. 5 shows a specific construction of the write selector 14 or the read selector 16. In the figure, the image forming signal FGATE is applied to one input of a NOR gate 20 whose output is connected to a load terminal Load of a counter 21. The write line sync signal WLSYNC or the read line sync signal RLSYN is fed to a clock terminal CLK of the counter 21. The counter 21 is connected at a terminal RC thereof to the other input of the NOR gate 20. Terminals Qa and Qb of the counter 21 each is connected to respective one of two inputs of a NAND gate 22. In this configuration, select signals meant for the buffers appear on the terminals Qa and Qb of the counter 21 and the output of the NAND gate 22.

Figure 9:
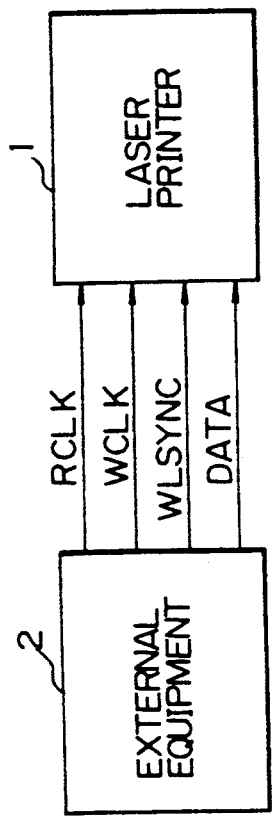
FIG. 9 shows signals which are transferred from external equipment to the a laser printer in the illustrative embodiment.
Figure 11:
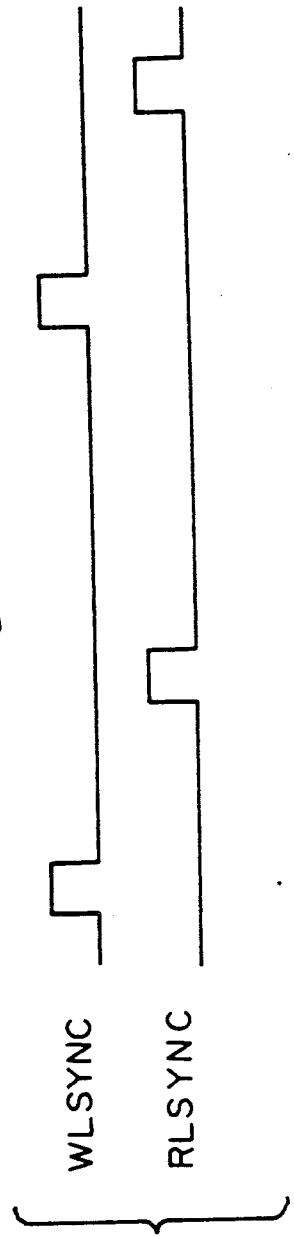

As shown in FIG. 9, the external equipment 2 sends to the laser printer 1 the read pixel clock RCLK, write pixel clock WCLK, write line sync signal WLSYNC, and image data DATA. The read line sync signal RLSYNC is generated inside the laser printer. As shown in FIG. 11, the sync signal RLSYNC is not synchronous to the sync signal WLSYNC.

Figure 8:
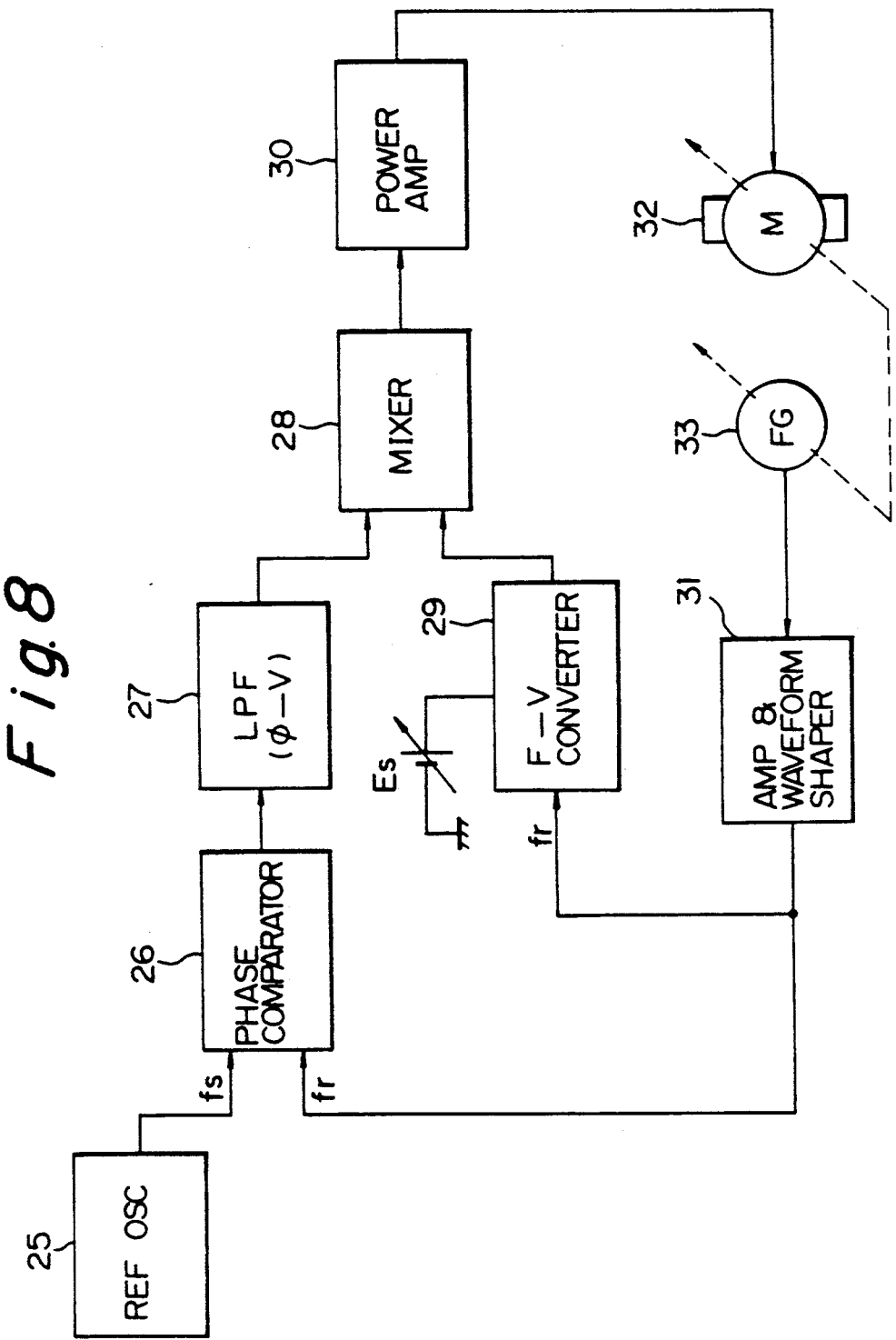
FIG. 8 is a block diagram schematically showing a control system implemented with a phase locked loop for polygonal mirror control and a FG servo.

In the illustrative embodiment, the rotation of the polygonal mirror 403 is controlled by a phase locked loop (PLL) which is shown in FIG. 8. In the specific arrangement of FIG. 8, a reference oscillator (REF OSC) 25 has an output connected to one input of a phase comparator (PHASE COMP) 26. The output of the phase comparator 26 is connected to the input of a low pass filter (LPF) 27. The output of the low pass filter 27 is connected to the input of a mixer 28 the output of which is connected to the input of a power amplifier (POWER AMP) 30. A motor (M) 32 is connected to the output of the power amplifier 30. An encoder (FG) 33 for sensing the rotation of the motor 32 is connected to an amplifying and waveform-shaping circuit (AMP & WAVEFORM SHAPE) 31 which is in turn connected to the other input of the phase comparator 26 and the input of a frequency-to-voltage (FC) converter 29. The output of the FC converter 29 is connected to the other input of the mixer 28.

Figure 6:
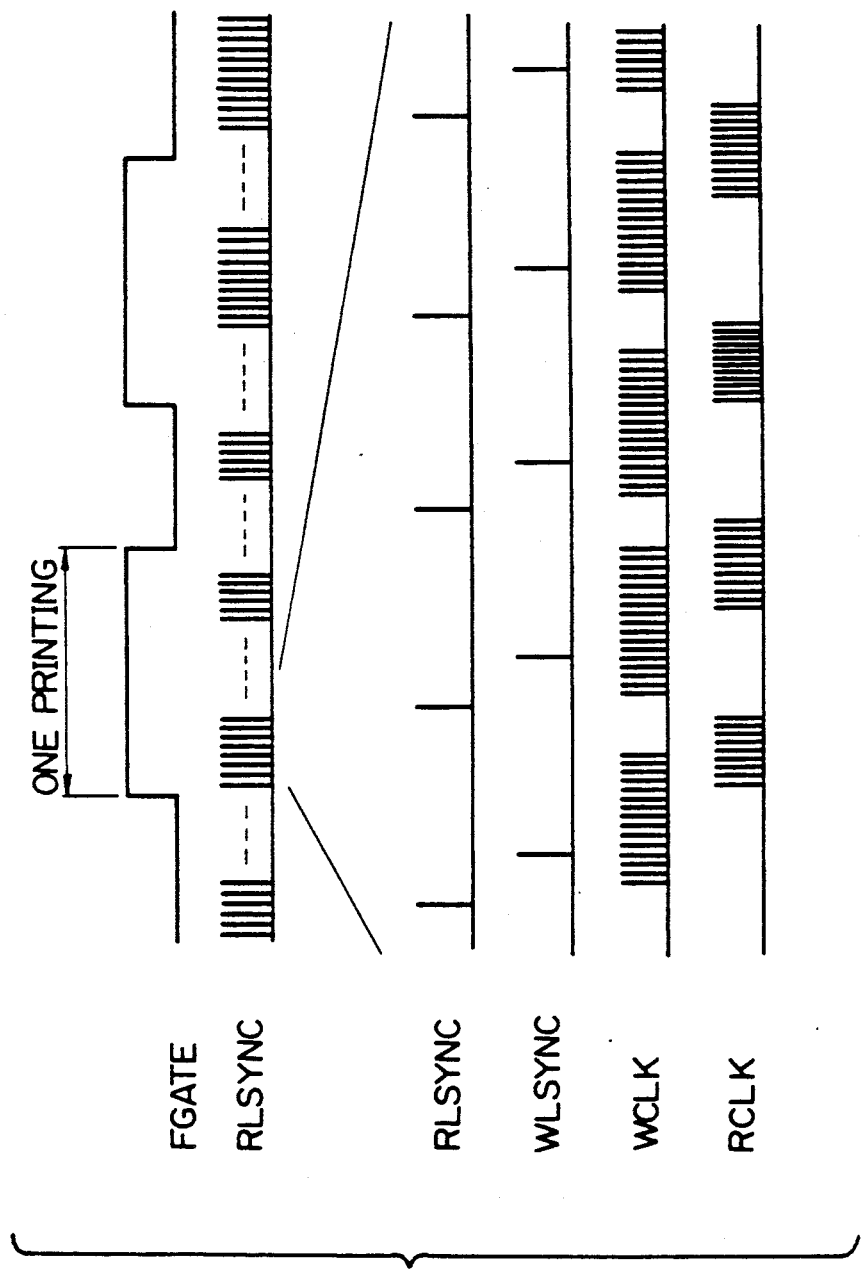
FIGS. 6 and 7 shows the waveforms of signals which appear in the embodiment.

In operation, during an image forming period, the image forming signal FGATE is in a high level or "H", as shown in FIG. 6. In this period, the gate 15, write selector 14, gate 17 and read selector 16 each is in an ON state. As a result, one of the buffers 10a, 10b and 10c is caused into a write state by the buffer select signal from the write selector 14. In this condition, image data DATA associated with the write pixel clock WCLK is written to the selected one buffer in synchronism with the write line sync signal WLSYNC. At the same time, another one of the buffers 10a, 10b and 10c is caused into a read state by the buffer select signal from the read selector 16, so that image data DATA associated with the read pixel clock RCLK is read thereoutof in synchronism with the read line sync signal RLSYNC.

Figure 7:
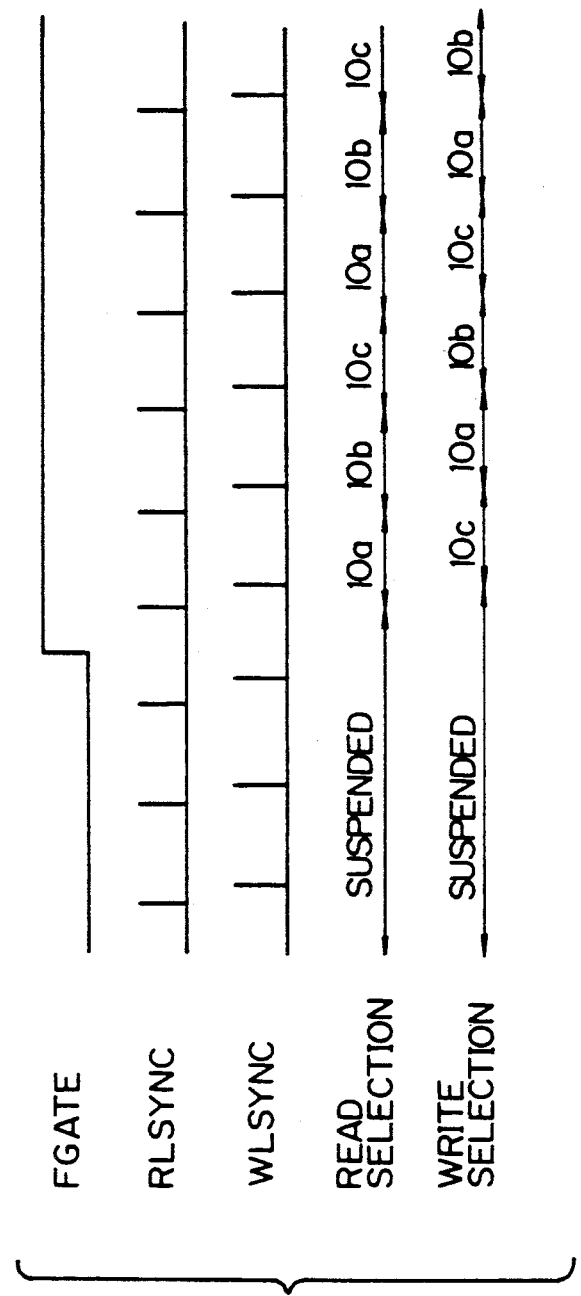

As shown in FIG. 7, while the image forming signal FGATE is "H", the buffers 10a to 10c are sequentially selected for writing and reading image data DATA, in such a manner as to prevent signals from conflicting with each other. During non-image forming period, the image forming signal FGATE turns to a low level or "L" and the gates 15 and 17 and line selectors 14 and 16 turn to OFF, whereby the selection for reading and writing image data DATA is interrupted. However, as shown in FIG. 5, the counter 21 of the PLL is constantly loaded since the output of the NOR gate 20 is "H". As a result, one of the buffers 10a to 10c is held in a read state, another is held in a write state, and another is held in an inoperative state. Hence, on the turn of the image forming signal FGATE from "L" to "H" at the beginning of the next image forming period, the operation is resumed under the above conditions and, therefore, with stability.

In this sense, the image forming signal FGATE plays the role of control means for sequentially causing the individual buffers to particular states during an image forming period and fixing them in particular states during a non-image forming period.

In FIG. 8, the phase comparator 26 compares the output frequency fr of the encoder 33 with the output frequency fs of the reference oscillator 25 with respect to phase. The resultant error signal is smoothed by the low pass filter 27 and then fed to the mixer 28. In this instance, the greater the phase difference, the greater the output signal of the low pass filter 27 is. On the other hand, the output signal of the encoder 33 routed through the amplifying and waveform shaping circuit 31 is applied to the FV converter 29. The output voltage of the FV converter 29 is mixed with the output signal of the low pass filter 27 by the mixer 28. The mixed signal from the mixer 28 is amplified by the power amplifier 30 and then applied to the motor 32. In this particular embodiment, control is effected such that the output signals of the reference oscillator 25 and encoder 33 coincide with each other not only in phase difference but also in frequency, i.e. fs=fr.

Assume that the rotation speed of the motor 32 is N (r. p. m), and that the encoder 33 produces a rectangular pulses per rotation of the motor 32. Then, there holds an equation:

$$fr = \frac{N}{60} a [Hz] \quad \text{Eq. (1)}$$

Since fr=fs, $$fs = fr = \frac{N}{60} a [Hz] \quad \text{Eq. (2)}$$

Further, assuming that the horizontal sync signal LSYNC appears at intervals of Tlsync, and that the polygonal mirror 403 has n surfaces, then:

$$Tlsync = \frac{60}{n \cdot N} \quad [sec] \quad \text{(Eq. (3))}$$

From the Eqs. (2) and (3), $$Tlsync = \frac{a}{n} \cdot \frac{1}{fs} \quad [sec] \quad \text{Eq. (4)}$$

Hence, assuming that the output signal of the reference oscillator 25 has a period of Ts, then $$Tlsync = \frac{a}{n} \cdot Ts \quad [sec] \quad \text{(Eq. (5))}$$

Figure 10:
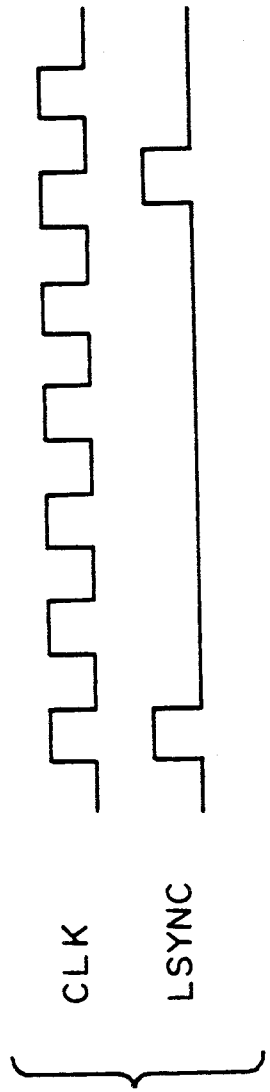
FIGS. 10 and 11 shows the waveforms of signals.

In the conditions of LSYNC and CLK shown in FIG. 10, Tlsync is expressed as:

$$Tlsync = \frac{21}{4} \cdot Ts \quad [sec] \quad \text{(Eq. (6))}$$

If a high-frequency clock whose period is t (<Ts) is available, Ts and Tlsync can be produced by dividing it, as follows:

$$Ts = 4t \quad \text{Eq.(7)}$$

$$Tlsync = 21t \quad \text{Eq.(8)}$$

In the Eq. (5), n and a each is an integer so that a/n is an integer or a particular fraction (determined by the clock). It follows that by selecting t there are obtained:

$$Ts = nt \quad \text{Eq.(9)}$$

$$Tlsync = at \quad \text{Eq.(10)}$$

With these equations, it is possible to produce Tlsync fully synchronous to Ts by dividing the clock whose period is t into Ts and Tlsync.

In this embodiment, when the image data DATA is transferred from the external equipment 2 to the laser printer 1, the laser printer 1 does not generate the horizontal sync signal LSYNC and, instead, the equipment 2 sends to the printer 1 a clock PCLK for driving the polygonal mirror 403 together with the write line sync signal WLSYNC.

As shown in FIG. 11, the read line sync signal RLSYNC and the write line sync signal WLSYNC are not synchronous to each other.

On the other hand, from the Eqs. (5) and (9), $$Trlsync = \frac{a}{n} \cdot Tpclk \quad \text{(Eq. (11))}$$

Although Trlsync is equal to Twlsync, they are different in phase from each other. Hence, the time when the laser printer 1 receives image data DATA and the time when the printer 1 starts writing are not coincident.

As stated above, the illustrative embodiment fixes the individual buffers in particular states during a non-image forming period to thereby free the buffer control section from malfunctions which would damage the storing device. Before an image forming period, the selectors are reset to select the buffers under the same conditions at all times. This is successful in insuring stable image forming operations. Moreover, the write operation of the printer is controlled by the external equipment, so that a plurality of printers can be connected in parallel to promote efficient operations.

Figure 12B:
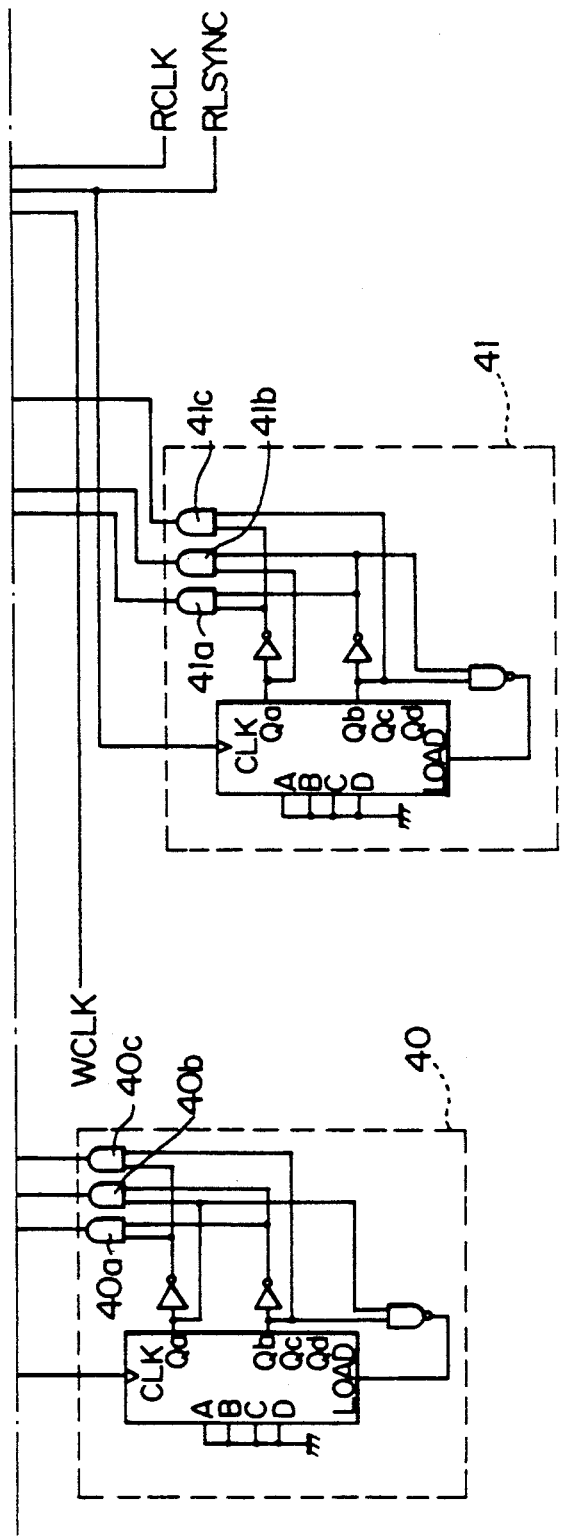
FIG. 12 is a block diagram schematically showing an alternative embodiment of the present invention.

Referring to FIG. 12, an alternative embodiment of the present invention will be described. In the figures, the same or similar components are designated by the same reference numerals, and redundant description will be avoided for simplicity. As shown, the alternative embodiment has a write counter 40 and a read counter 41 each being a ternary counter. The write counter 40 has output AND gates 40a, 40b and 40c which are connected respectively to the buffers 10a, 10b, 10c and gates 11a, 11b and 11c. Likewise, the read counter 41 has output AND gates 41a, 41b and 41c which are connected to the gates 12a, 12b and 12c and address decoders 13a, 13b and 13c, respectively. The read pixel clock RCLK is fed to the address decoders 13a to 13c, while the read line sync signal RLSYNC is fed to the address decoders 13a to 13c and read counter 41. Further, the write pixel clock WCLK is applied to the address decoders 13a to 13c while the write line sync signal WLSYNC is applied to the write counter 40. The rest of the construction is identical with the previous embodiment.

In this particular embodiment, when the outputs of the AND gates 40a to 40c of the write counter 40 turn to "H", their associated buffers 10a to 10c are caused into a write state. Likewise, when the outputs of the AND gates 41a to 41c of the read counter 41 turn to "H", their associated buffers 10a to 10c are caused into a read state. Should only two buffers are used, the write and read operations would overlap, as shown in FIG. 14. In contrast, the illustrative embodiment prevents the signals from conflicting with each other and thereby insures accurate write and read operations, as shown in FIG. 13. Since the write and read counters 40 and 41 both are held in a loaded state even during a non-image forming period, the buffers 10a to 10c are held in the non-accessed state while being provided with a predetermined order and, at the beginning of an image forming period, resume their operations stably.

In summary, in accordance with the present invention, the control over buffers is free from errors during non-image forming periods and, therefore, eliminates the damage to a storing device and the loss of data. Hence, at the beginning of an image forming period, image data can be read and written stably and efficiently in a predetermined order, i.e., without any conflict.

Various modifications will become possible for those skilled in the art after receiving the teachings of the present disclosure without departing from the scope thereof.

What is claimed is:

1. An image data storing device for an image forming apparatus, comprising:
   a plurality of line buffers for storing one line of data each;
   writing means for writing image data transferred from external equipment to said plurality of line buffers in response to an external line synchronizing (sync) signal fed from said external equipment;
   internal line sync signal generating means for generating an internal line sync signal which is not synchronous to said external line sync signal;
   image forming signal generating means for generating an image forming signal in association with an image forming period for forming one frame of image;
   selecting means for causing each of said plurality of line buffers into particular one of a read state, a write state, and an inoperative state; and
   control means for causing, during a non-image forming period, said selecting means to selectively cause said plurality of line buffers into said read state, write state and inoperative state in response to said image forming signal while, during a non-image forming period, causing said selecting means to maintain said plurality of buffers in said read state, write state, and inoperative state.

* * * * *